DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 416

T901,021

COMPOSITION COMPRISED OF ULTRAHIGH MOLECULAR WEIGHT POLYETHYLENE CONTAINING CARBON BLACK

Barry H. Vernick, Newark, Del., assignor to Hercules Incorporated, Wilmington, Del.

Filed July 6, 1971, Ser. No. 160,147
Int. Cl. C08f *45/08*
U.S. Cl. 260—41 R
No Drawing. 14 Pages Specification

The addition of 0.05 to 1% by weight of carbon black to ultra high molecular weight polyethylene results in improved physical properties as well as extremely good RF heating characteristics. The improvement in physical properties appears as improvement in wet sand abrasion index, double notched Izod impact strength, tensile strength and yield strength. Improvements of 5 to 25% and more in each of these parameters have been observed due to the presence of carbon black.